(12) United States Patent
Hong et al.

(10) Patent No.: US 9,678,379 B2
(45) Date of Patent: *Jun. 13, 2017

(54) LIQUID CRYSTAL DISPLAY APPARATUS AND METHOD OF MANUFACTURING THE SAME

(71) Applicant: Samsung Display Co., Ltd., Yongin-si, Gyeonggi-Do (KR)

(72) Inventors: Sunghwan Hong, Suwon-si (KR); Soonjoon Rho, Suwon-si (KR); Jae-soo Jang, Suwon-si (KR); Junha Park, Anyang-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/869,605

(22) Filed: Sep. 29, 2015

(65) Prior Publication Data

US 2016/0018683 A1 Jan. 21, 2016

Related U.S. Application Data

(62) Division of application No. 13/188,779, filed on Jul. 22, 2011, now Pat. No. 9,151,981.

(30) Foreign Application Priority Data

Sep. 27, 2010 (KR) .......................... 10-2010-0093412

(51) Int. Cl.
*G02F 1/1335* (2006.01)

(52) U.S. Cl.
CPC ...... *G02F 1/1335* (2013.01); *G02F 1/133524* (2013.01); *G02F 1/133526* (2013.01); *G02F 1/133528* (2013.01)

(58) Field of Classification Search
CPC ........................ G02F 1/1335; G02F 1/133528
See application file for complete search history.

(56) References Cited

U.S. PATENT DOCUMENTS 6,833,884 B2 12/2004 Kim et al.
8,208,095 B2 6/2012 Rho et al.
(Continued)

FOREIGN PATENT DOCUMENTS

KR 10-2008-0062177 7/2008

*Primary Examiner* — Dung Nguyen
(74) *Attorney, Agent, or Firm* — Innovation Counsel LLP

(57) ABSTRACT

The viewing angle of a Liquid Crystal Display (LCD) apparatus is expanded by means of a sampled light redirecting layer, In one embodiment, the sampled light redirecting layer is formed as a compensation layer disposed between a top polarizing plate and the rest of a liquid crystal display panel having a first substrate, a second substrate, and a liquid crystal layer interposed therebetween. The compensation layer includes at least two optical path changing patterns disposed in interleaved manner. The two optical path changing patterns have different refractive indexes. As a result of the different refractive indices and shapes of the at least two different optical path changing patterns some of the light rays sampled out of the output of the rest of a liquid crystal display panel are directed in a first direction by means of reflection or refraction and some are directed in a different second direction, thereby improving a side visibility of the display apparatus.

14 Claims, 15 Drawing Sheets

(56) References Cited

U.S. PATENT DOCUMENTS

| | | |
|---|---|---|
| 9,151,981 B2 * | 10/2015 | Hong ................ G02F 1/133524 |
| 2006/0238685 A1 | 10/2006 | Shibasaki et al. |
| 2007/0024781 A1 | 2/2007 | Choi et al. |
| 2008/0143638 A1 | 6/2008 | Kim et al. |
| 2011/0051061 A1 | 3/2011 | Sakai et al. |
| 2012/0019752 A1 * | 1/2012 | He ........................ G02B 27/22 |
| | | 349/117 |

* cited by examiner

LIQUID CRYSTAL DISPLAY APPARATUS AND METHOD OF MANUFACTURING THE SAME

CROSS-REFERENCE TO RELATED APPLICATIONS

This application is a divisional application of U.S. patent application Ser. No. 13/188,779 filed on Jul. 22, 2011, which relies for priority upon Korean Patent Application No. 10-2010-0093412 filed on Sep. 27, 2010, the contents of which are herein incorporated by reference in its entirety.

BACKGROUND

1. Field of Disclosure

The present disclosure of invention relates to a display apparatus and a method of manufacturing the display apparatus. More particularly, the present invention relates to a liquid crystal display apparatus capable of improving image visibility and a method of manufacturing the liquid crystal display apparatus.

2. Description of Related Technology

In general, a liquid crystal display (LCD) includes an array substrate, an opposite substrate facing the array substrate, and a liquid crystal layer disposed between the array substrate and the opposite substrate. The array substrate is provided with a pixel electrode, and the opposite substrate is provided with a common electrode facing the pixel electrode. Liquid crystal molecules included in the liquid crystal layer are aligned in a direction decided by an electric field generated between the pixel electrode and the common electrode, and a transmittance of a light depends upon the alignment directions of the liquid crystal molecules. A to-be perceived image may be formed by controlling light transmittance of various pixels.

However, since the liquid crystal molecules have anisotropic refractive index, the visibility of the to-be perceived image may be changed according to a viewing angle of the viewer. That is, the visibility when the user watches/views the display panel at a side portion of the display panel may be significantly worse than the visibility when the user watches the display panel from a frontal head-on position relative to the display panel. Thus, when compared to a cathode ray tube display apparatus, the liquid crystal display has a defect of a narrow acceptable viewing angle due to light ray directivity characteristics of the conventional LCD device.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

Exemplary embodiments in accordance with the present disclosure provide a liquid crystal display apparatus having a wider viewing angle and improved visibility compared to conventional LCD devices.

Exemplary teachings of the present disclosure also provide a method of manufacturing the liquid crystal display apparatus.

More specifically, the viewing angle of a Liquid Crystal Display (LCD) apparatus is expanded by means of a sampled light redirecting layer, In one embodiment, the sampled light redirecting layer is formed as a compensation layer disposed between a top polarizing plate and the rest of a liquid crystal display panel having a first substrate, a second substrate, and a liquid crystal layer interposed therebetween. The compensation layer includes at least two different optical path changing patterns disposed in interleaved manner. The at least two optical path changing patterns have different refractive indexes. As a result of the different refractive indices and shapes of interface surfaces where the at least two different optical path changing patterns contact one another, some of the light rays sampled out of the output of the rest of a liquid crystal display panel are directed in a first direction by means of reflection or refraction and some are directed in a different second direction by means of reflection or refraction, thereby improving a side visibility of the display apparatus.

Yet more specifically, in one embodiment, a liquid crystal display apparatus includes a first substrate, a second substrate, and a liquid crystal layer. The first substrate includes a first base substrate and a plurality of pixel units arranged on the first base substrate. The second substrate includes a second base substrate facing the first base substrate and the compensation layer is arranged on one surface of the second base substrate. The compensation layer includes two interleaved (interdigitated) optical path changing patterns that function to change the output directions of incident light rays, where the two optical path changing patterns have different indexes and are alternately arranged in a direction substantially in parallel to the one surface. The liquid crystal layer is disposed between the first substrate and the second substrate.

A method of manufacturing a liquid crystal display apparatus is provided as follows. A first substrate including a first base substrate and a plurality of pixels arranged on the first base substrate is formed. A second substrate including a second base substrate facing the first base substrate and a compensation layer arranged on one surface of the second base substrate to change a path of an incident light is formed. A liquid crystal layer is disposed between the first and second substrates. A first layer having a first refractive index is formed on the one surface of the second base substrate. The first layer is patterned to form a plurality of first optical path changing patterns arranged substantially in parallel to the first base substrate. A second layer having a second refractive index different from the first refractive index is formed on the second base substrate on which the first optical path changing patterns are formed. The second layer is patterned to form a plurality of second optical path changing patterns each arranged between two first optical path changing patterns adjacent to each other.

Other aspects of the present teachings will become apparent from the below detailed description.

BRIEF DESCRIPTION OF THE DRAWINGS

The above and other advantages of the present disclosure of invention will become readily apparent by reference to the following detailed description when considered in conjunction with the accompanying drawings wherein.

DETAILED DESCRIPTION

Figure 1:
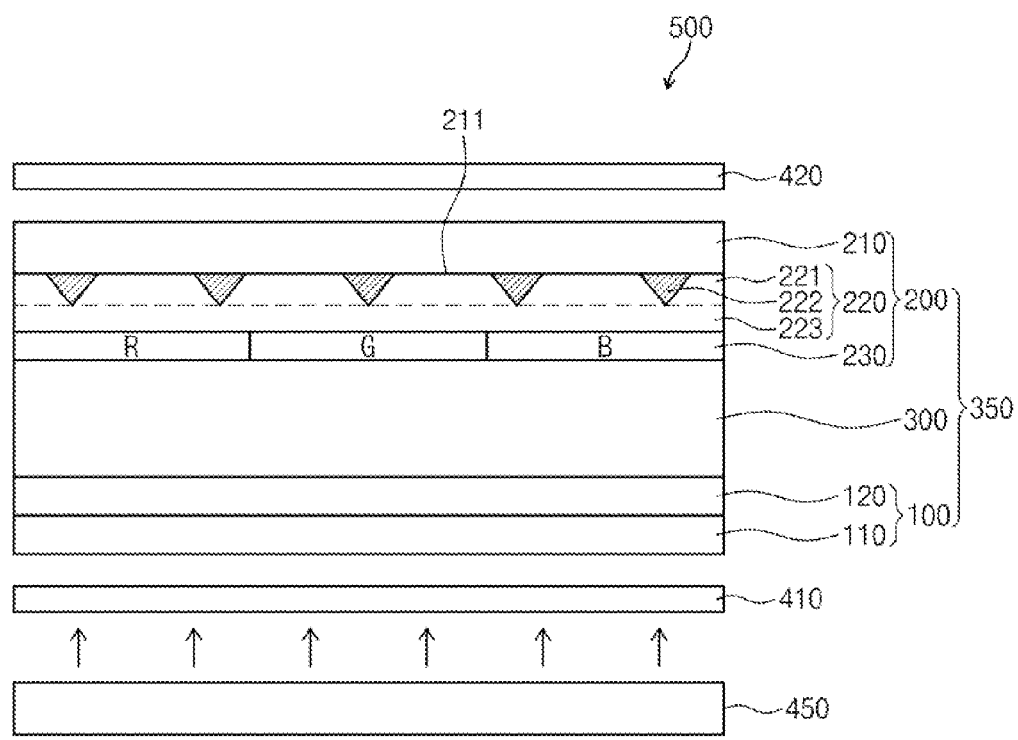
FIG. 1 is a cross-sectional view showing a display apparatus according to an exemplary embodiment.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present disclosure most closely pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure of invention will be explained in detail with reference to the accompanying drawings.

FIG. 1 is a cross-sectional view showing a display apparatus according to a first exemplary embodiment in accordance with the disclosure.

Referring to FIG. 1, a display apparatus 500 includes a display panel 350 structured to control transmittance of incident light rays using a liquid crystal. The display apparatus 500 further includes a first polarizing plate 410 that polarizes light rays provided to the display panel 350 and a second polarizing plate 420 that polarizes light rays as they exit from the display panel 350. The display panel 350 is disposed between the first and second polarizing plates 410 and 420.

The display apparatus 500 yet further includes a backlight unit 450 that generates the incident light rays and provides the light rays to the display panel 350. The backlight unit 450 is arranged under the first polarizing plate 410. Thus, light generated from the backlight unit 450 is output to a viewing user of the display apparatus 500 after sequentially passing through the first polarizing plate 410, the display panel 350, and the second polarizing plate 420.

The display panel 350 includes a first substrate 100, a second substrate 200 facing the first substrate 100, and a liquid crystal material layer 300 disposed between the first substrate 100 and the second substrate 200. The first substrate 100 is disposed adjacent to the first polarizing plate 410, and the second substrate 200 is disposed adjacent to the second polarizing plate 420.

The first substrate 100 includes a first base substrate 110 and a pixel array layer 120 disposed on the first base substrate 110. Although not explicitly shown in FIG. 1, the pixel array layer 120 is understood to be a layer on which a plurality of pixel units are arranged in a matrix configuration, and each pixel unit may include a thin film transistor (TFT), a pixel electrode and optionally a storage capacitance.

The second substrate 200 includes a second base substrate 210 facing the first base substrate 110, a compensation layer 220 disposed on a first major surface 211 of the second base substrate 210, and a color filter layer 230 disposed on the compensation layer 220. The first major surface 211 of the second base substrate 210 may face the liquid crystal layer 300 or the second polarizing plate 420. In FIG. 1, the compensation layer 220 is shown disposed on the first major surface 211 and facing away from the liquid crystal layer 300.

The compensation layer 220 includes a first optical path changing pattern 221 and a second optical path changing pattern 222 having different refractive indexes from each other. Each of the first and second optical path changing patterns 221 and 222 is provided as a plurality of spaced apart regions, and in one embodiment, the first and second optical path changing patterns 221 and 222 are alternately arranged one after the next in a repeat direction which is substantially parallel to the first major surface 211 of the second base substrate 210. As an example of the present embodiment, the first optical path changing pattern 221 has a first refractive index (n1) and the second optical path changing pattern 222 has a second refractive index (n2) that is lower than the first refractive index (n2<n1).

The first optical path changing pattern 221 may have its regions formed of an organic resin having for example an acrylic-based resin or polyamide-based resin with relatively large refractive index. In addition, the first optical path changing pattern 221 may have its regions formed to exhibit the first refractive index (n1) in the range of about 1.2 to about 2.1 (while n1 remains >n2). In order to increase the first refractive index (n1) of the first optical path changing pattern 221, a titanium oxide (TiOx) may be added into the organic resin.

The second optical path changing pattern 222 may include at least one of low refractive index and light-passing materials such as a silicon nitride (SiNx), a silicon oxide (SiOx), a titanium oxide (TiOx), an indium tin oxide (ITO), an indium zinc oxide (IZO), or a zinc oxide. The microstructure of the second pattern/region 222 may be made less dense (e.g., more hollowed) than that of the first pattern/region 221 so as to thereby reduce the refractive index (n2) of the second pattern/region 222. Also, the second optical path changing pattern 222 may have its regions formed to exhibit the second refractive index (n2) in a range of about 1 to about 1.6, where the second refractive index (n2) is lower than the first refractive index (n1). The second pattern/region 222 may be filled with air.

As shown in FIG. 1, the compensation layer 220 may further include at least one supportive/protective cover layer 223 that protectively covers and/or supports the first and second optical path changing patterns 221 and 222 (e.g., protecting 221/222 from chemicals that might be present in layer 230). As an example of the present embodiment, the cover layer 223 may include the same material as the first optical path changing pattern 221.

The color filter layer 230 disposed on the compensation layer 220 may include a red color filter R, a green color filter G, and a blue color filter B. As another exemplary embodiment, an organic layer colored with corresponding pigments or dyes may be used as part of the first optical path changing pattern 221. In case that the organic layer colored with pigments or dyes is used for the first optical path changing pattern 221, the red colored, green colored and the blue colored pixel filters may be integrally formed by the first optical path changing pattern 221. Therefore, the first optical path changing pattern 221 may perform a dual function as substituting for or supplementing the color filter layer 230, and thus, in one case the color filter layer 230 may be omitted from the second substrate 200.

Although not shown in FIG. 1, the second substrate 200 may further include a common electrode (not shown) and a black matrix (not shown) in addition to the color filter layer 230.

Meanwhile, the liquid crystal material of layer 300 may include a twisted nematic (TN) liquid crystal, a vertical alignment (VA) liquid crystal, or a cholesteric liquid crystal.

Figure 2:
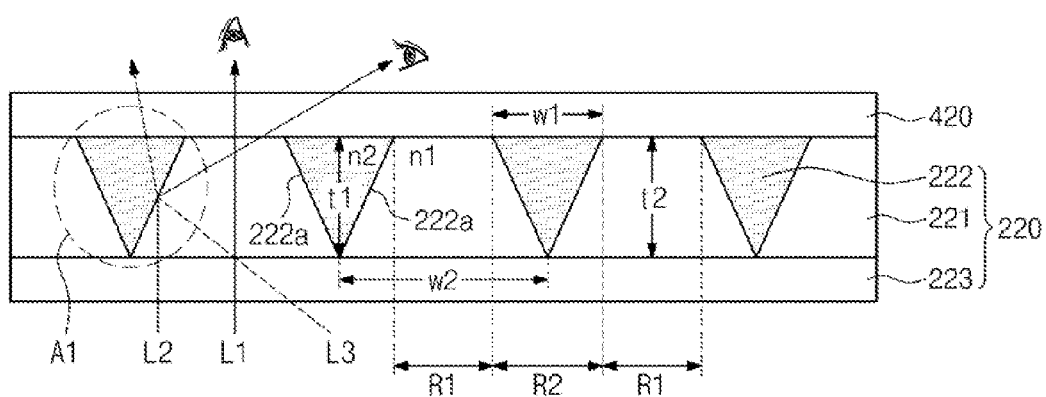
FIG. 2 is a cross-sectional view showing a compensation layer of FIG. 1.

FIG. 2 is a cross-sectional view showing the compensation layer of FIG. 1.

Referring to FIG. 2, the compensation layer 220 includes a plurality of first optical path changing patterns or regions 221 having the first refractive index n1 and a plurality of second optical path changing patterns or regions 222 having the second refractive index n2 that is lower than the first refractive index n1. Each of the second optical path changing patterns 222 is arranged between two spaced apart first optical path changing patterns 221 that neighbor each other.

An area or region between a first pair of spaced apart but adjacent second optical path changing patterns 222 is defined in FIG. 2 as a first area R1 through which incident light rays may pass. In the first area R1, the compensation layer 220 includes a first material having the greater first refractive index n1. A second region or area between a pair of spaced apart but adjacent first areas R1 is defined in FIG. 2 as a second area R2 from which incident light rays (e.g., L2, L3) may be reflected, totally reflected or refracted therethrough. In the second area R2, the compensation layer 220 includes the first material having the first refractive index n1 and the second material having the lesser second refractive index n2.

Since the compensation layer 220 includes one homogenous light-passing medium in the first area R1, a first light ray L1 incident to the first area R1 mostly passes through the first area R1 without being refracted. However, the compensation layer 220 includes two light-passing media having different refractive indexes (n2>n1) in the second area R2, a second light ray L2 and a third light ray L3 incident to the second area R2 may be respectively essentially totally reflected and essentially totally refracted due to the different refractive indexes of the two media in second area R2.

More particularly, an interface or contact surface 222a at which the first optical path changing pattern 221 comes into contact with the second optical path changing pattern 222 is provided in the second area R2, and the second light ray L2 and the third light ray L3 (which light rays may be pre-polarized and directed in the vertical (+Z) direction or another direction as they enter cover layer 223) are respectively totally reflected or refracted at that contact surface 222a due to angle of incidence and difference in refractive indices (n1/n2). As an exemplary embodiment of the present invention, the contact surface 222a is inclined by a predetermined angle θ with respect to the one surface 211. The angle θ may be set in a range of about 30° to about 85°. Therefore, as shown in FIG. 2, the second light ray L2 vertically incident to a light incident surface of the compensation layer 220 is totally reflected in the second area R2, and the third light ray L3 incident to the light incident surface of the compensation layer 220 while being inclined (unlike L1 and L2) by the angle θ may be refracted.

A total reflection angle of the second light ray L2 may be decided by a difference between the first refractive index n1 and the second refractive index n2 and an inclination degree (that is, the angle θ) of the contact surface 222a. The second light L2 that is totally reflected at the contact surface 222a may be exited while being largely inclined with respect to a hypothetical normal line of the screen that is substantially perpendicular to the first surface 211 of the second base substrate 210. Therefore, a side visibility of the display apparatus 500 may be improved since light rays such as L2 are intentionally reflected essentially totally in the direction of an aside user while light rays such as L1 are intentionally caused to be passed in the direction of a head-on viewer of the LCD device 500.

Since the second light ray L2 vertically incident to the light incident surface of the compensation layer 220 has been already processed by the liquid crystal layer 300 and the color filters layer 230, it includes an accurate gray scale and color information, and therefore the angle θ of the contact surface 222a may be set to totally reflect the second light ray L2 vertically incident to the light incident surface of the compensation layer 220.

Meanwhile, the third light ray L3 incident to the light incident surface of the compensation layer 220 while being inclined generally does not include the accurate gray scale and/or color information intended for it. Thus, the second optical path changing pattern 222 may further include a direction sensitive optical absorbent to absorb (attenuate) the third light ray L3 refracted at the contact surface 222a. As an example of the present embodiment, the second optical path changing pattern 222 may include black carbon particles oriented to absorb mis-directed incident light rays such as L3.

The second optical path changing pattern 222 may be in the form of a triangular prism (see also FIG. 6) or another shape having the illustrated triangular cross section and may have a triangle base width w1 of about 0.5 μm to about 10 μm and a thickness (triangle height) t1 of about 0.1 μm to about 3 μm. The first optical path changing pattern 221 may be in the form of a trapezoidal prism (see also FIG. 6) or another shape having the illustrated trapezoidal cross section and may have a trapezoid base width w2 of about 3 μm to about 30 μm and a thickness (trapezoid height) t2 of about 1 μm to about 10 μm. That is, the first optical path changing pattern 221 may have a thickness t1 equal to or thicker than that of the second optical path changing pattern 222.

Figure 3:
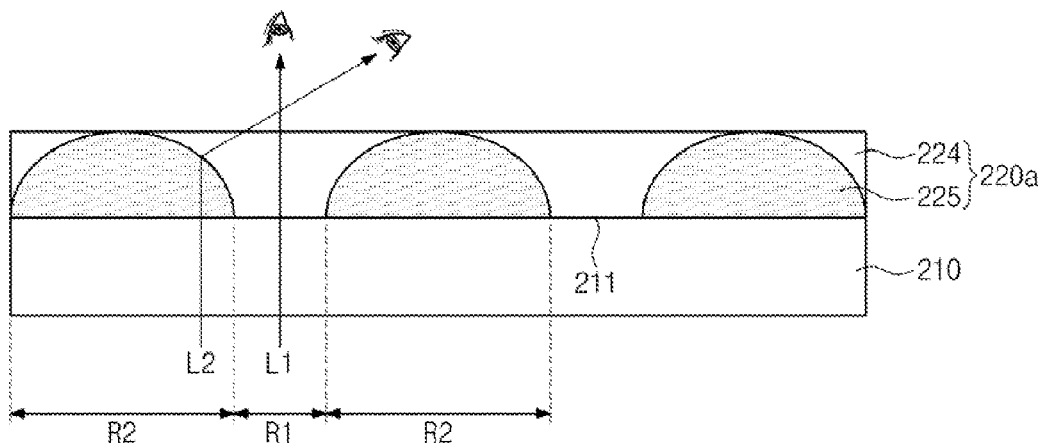
FIGS. 3 to 5 are cross-sectional views showing compensation layers according to respective other exemplary embodiments.
Figure 4:
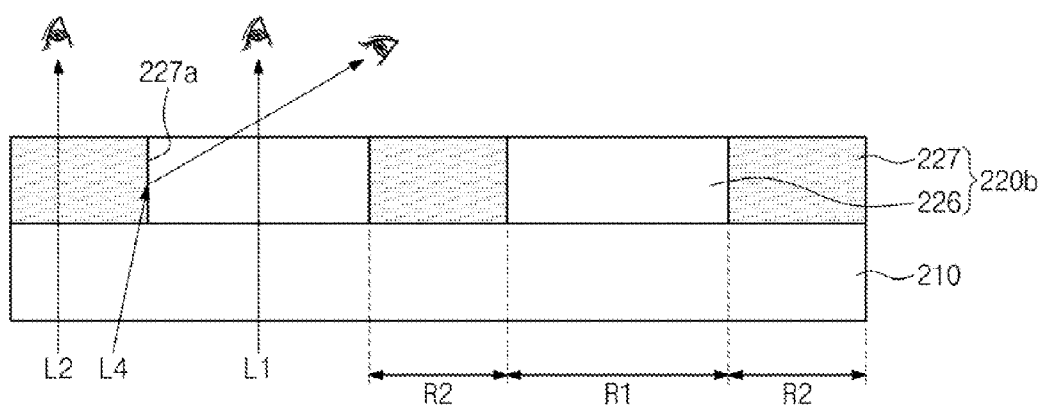
Figure 5:
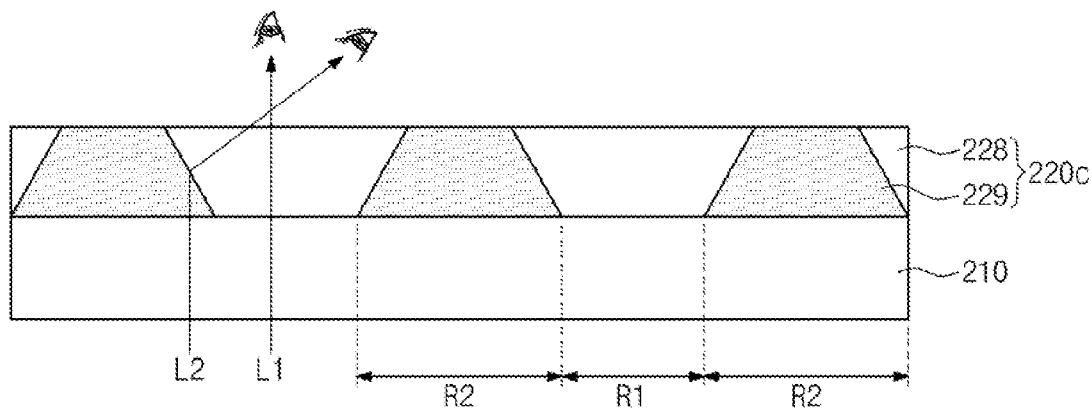

FIGS. 3 to 5 are cross-sectional views showing a compensation layer according to another exemplary embodiment in accordance with the present disclosure.

Referring to FIG. 3, a compensation layer 220a includes a first optical path changing pattern 224 having a first refractive index n1 and a second optical path changing pattern 225 having a second refractive index n2 that is lower than the first refractive index n1. The first optical path changing pattern 224 and the second optical path changing pattern 225 are alternately arranged in a direction that is substantially in parallel to one surface 211 of a second base substrate 210.

The second optical path changing pattern 225 in FIG. 3 has a half circle cross sectional shape in its cross-sectional view. As an exemplary embodiment of the present invention, the second optical path changing pattern 225 may have a curvature of about 0.5 or less. Vertically directed light rays (not shown, see L1, L2 of FIG. 2) striking the inclined portions of the n1>n2 optical interface are refracted in respective inclined directions depending on the instant angle of incline and on the refractive index ratio (n1/n2).

An area or region between adjacent second optical path changing patterns 225 is defined in FIG. 3 as a first area R1 through which incident light rays may pass. In the first area R1, the compensation layer 220a includes a first material having the greater first refractive index n1. A second region or area between adjacent first areas R1 is defined as a second area R2 from which incident light rays may be reflected, totally reflected or refracted therethrough. In the second area R2, the compensation layer 220a includes the first material having the first refractive index n1 and the second material having the lesser second refractive index n2.

Since the compensation layer 220a includes one homogenous light-passing medium in the first area R1, a first light ray L1 vertically incident to the light incident surface of the compensation layer 220a in the first area R1 mostly passes through the first area R1 without being refracted. However, a second light ray L2 vertically incident to the light incident surface of the compensation layer 220a in the second area R2 may be respectively essentially totally reflected and essentially totally refracted due to the different refractive indexes of the two media in second area R2.

Therefore, a side visibility of the display apparatus 500 may be improved since light rays such as L2 are intentionally reflected essentially totally in the direction of an aside user while light rays such as L1 are intentionally caused to be passed in the direction of a head-on viewer of the LCD device 500.

Referring to FIG. 4, a compensation layer 220b includes a first optical path changing pattern 226 having a first refractive index n1 and a second optical path changing pattern 227 having a second refractive index n2 that is lower than the first refractive index n1. The first optical path changing pattern 226 and the second optical path changing pattern 227 are alternately arranged in a direction that is substantially in parallel to one surface of a second base substrate 210.

The first and second optical path changing patterns 226 and 227 may have a rectangular shape in a cross-sectional view. In this case, a medium interface or contact surface 227a at which the first optical path changing pattern 226 comes into contact with the second optical path changing pattern 227 may be substantially perpendicular to the one surface 211.

Since the compensation layer 220b includes one homogenous light-passing medium in the first area R1, the first light ray L1 and the second light ray L2 vertically incident to a light incident surface of the compensation layer 220b in the first area R1 mostly passes through the first area R1 and the second area R2 without being refracted, respectively.

However, a fourth light ray L4 ray incident to the contact surface 227a of the compensation layer 220b may be respectively essentially totally reflected and essentially totally refracted due to the different refractive indexes of the two media. As an exemplary embodiment in accordance with the present disclosure, the fourth light ray L4 may be approximately vertically incident to the light incident surface of the compensation layer 220b.

Therefore, a side visibility of the display apparatus 500 may be improved since light rays such as L2 are intentionally reflected essentially totally in the direction of an aside user while light rays such as L1 are intentionally caused to be passed in the direction of a head-on viewer of the LCD device 500.

Referring to FIG. 5, a compensation layer 220c includes a first optical path changing pattern 228 having a first refractive index n1 and a second optical path changing pattern 229 having a second refractive index n2 that is lower than the first refractive index n1. The first optical path changing pattern 228 and the second optical path changing pattern 229 are alternately arranged in a direction that is substantially in parallel to one surface 211 of a second base substrate 210.

The second optical path changing pattern 229 may have a trapezoid shape in a cross-sectional view, and the first optical path changing pattern 228 may have a reverse trapezoid shape. As in the case of FIG. 3, vertically directed light rays (not shown, see L1, L2 of FIG. 2) striking the inclined portions of the n1>n2 optical interfaces are refracted in respective inclined directions depending on the instant angle of incline and on the refractive index ratio (n1/n2).

Since the compensation layer 220c includes one homogenous light-passing medium in the first area R1, a first light ray L1 vertically incident to a light incident surface of the compensation layer 220c in the first area R1 mostly passes through the first area R1 without being refracted. However, a second light ray L2 vertically incident to the light incident surface of the compensation layer 220c in the second area R2 may be respectively essentially totally reflected and essentially totally refracted due to the different refractive indexes of the two media in second area R2.

Therefore, a side visibility of the display apparatus 500 may be improved since light rays such as L2 are intentionally reflected essentially totally in the direction of an aside user while light rays such as L1 are intentionally caused to be passed in the direction of a head-on viewer of the LCD device 500.

Figure 6:
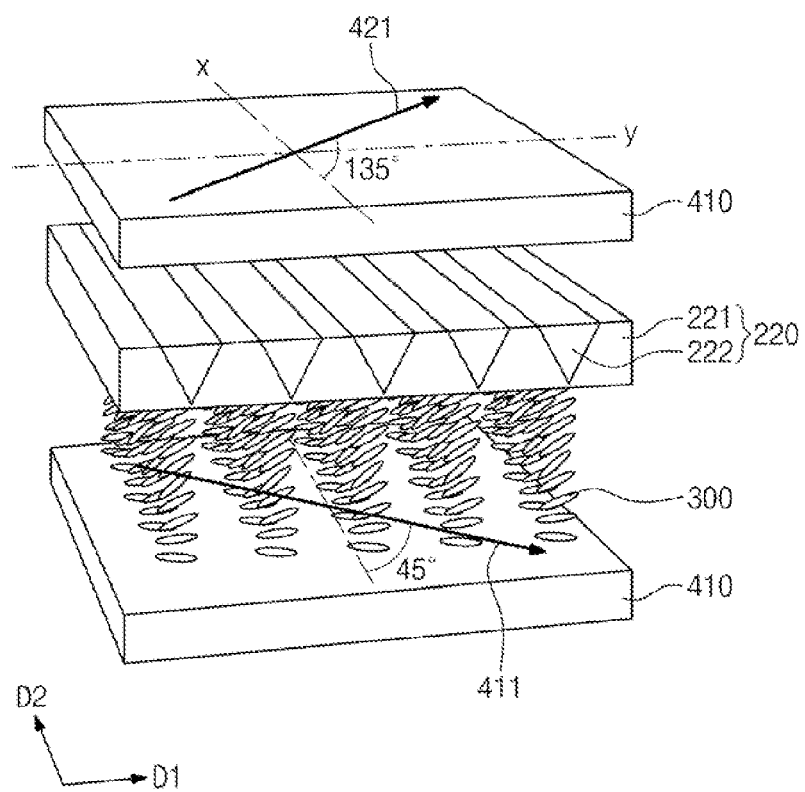
FIG. 6 is a perspective view showing a first polarizing plate, a compensation layer, and a second polarizing plate of FIG. 1.

FIG. 6 is a perspective view showing the first polarizing plate, the compensation layer, and the second polarizing plate of FIG. 1.

Referring to FIG. 6, the compensation layer 220 and the liquid crystal layer 300 are disposed between the first polarizing plate 410 and the second polarizing plate 420. As an example embodiment in accordance with the present disclosure, the liquid crystal layer 300 may include a twisted nematic liquid crystal. In this case, the first polarizing plate 410 may have a first light absorption axis 411 and the second polarizing plate 420 may have a second absorption axis 421 that is substantially perpendicular to the first absorption axis 411. The first absorption axis 411 is inclined by about 45° with respect to an x-axis, and the second absorption axis 421 is inclined by about 135° with respect to the x-axis to be substantially perpendicular to the first absorption axis 411. The x-axis may be parallel to the D2 direction.

The compensation layer 220 includes the first optical path changing pattern 221 having the first refractive index n1 and the second optical path changing pattern 222 having the second refractive index n2 that is lower than the first refractive index n1. The first optical path changing pattern 221 and the second optical path changing pattern 222 are alternately arranged along a first direction D1, and each of the first and second optical path changing patterns 221 and 222 is extended in a second direction D2 that is substantially perpendicular to the first direction D1. As illustrated, the second optical path changing pattern 222 may have a triangular prism shape.

As an exemplary embodiment in accordance with the present disclosure, the second direction D2 may be a direction that is substantially in parallel to the x-axis. Then, the second optical path changing pattern 222 is inclined by about 135° with respect to the second absorption axis 421 of the second polarizing plate 420 and is inclined by about 45° with respect to the first absorption axis 411 of the first polarizing plate 410.

Figure 7:
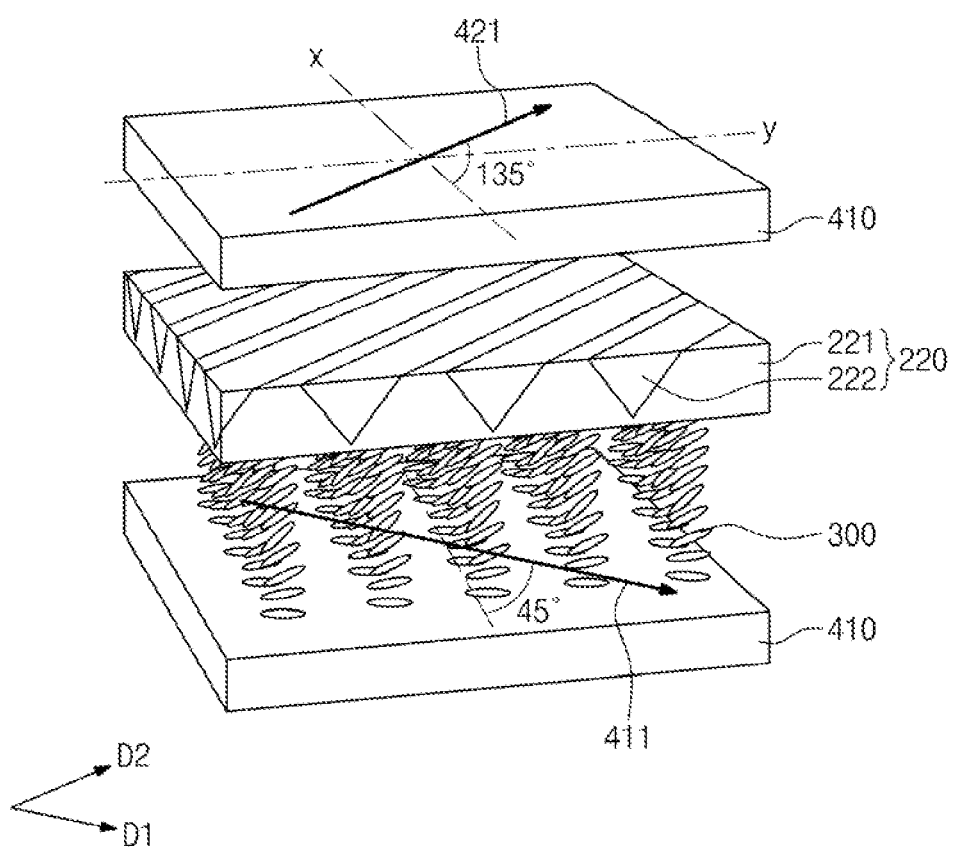
FIG. 7 is a perspective view showing a first polarizing plate, a compensation layer, and a second polarizing plate according to another exemplary embodiment.

FIG. 7 is a perspective view showing a first polarizing plate, a compensation layer, and a second polarizing plate according to another exemplary embodiment in accordance with the present disclosure.

Referring to FIG. 7, a compensation layer 220 and a liquid crystal layer 300 are disposed between a first polarizing plate 410 and a second polarizing plate 420. As an example, the liquid crystal layer 300 may include a twisted nematic liquid crystal. The first polarizing plate 410 includes a first absorption axis 411 that is inclined by about 45° with respect to an x-axis, and the second polarizing plate 420 includes a second absorption axis 421 that is inclined by about 135° with respect to the x-axis to be substantially perpendicular to the first absorption axis 411.

The compensation layer 220 includes a first optical path changing pattern 221 having a first refractive index n1 and a second optical path changing pattern 222 having a second refractive index n2 that is lower than the first refractive index n1. The first optical path changing pattern 221 and the second optical path changing pattern 222 are alternately arranged in a first direction D1, and each of the first and second optical path changing patterns 221 and 222 is extended in a second direction D2 that is substantially perpendicular to the first direction D1. Thus, the second optical path changing pattern 222 may have a triangular prism shape.

In this particular example, the first direction D1 may be substantially in parallel to the first absorption axis 411, and the second direction D2 may be substantially in parallel to the second absorption axis 421 and thus the medium interface surfaces where 221 meets 222 may extend as being substantially perpendicular to the first absorption axis 411 and thus as substantially parallel to the light transmission axis (not shown) of the first polarizing plate 410.

Figure 8A:
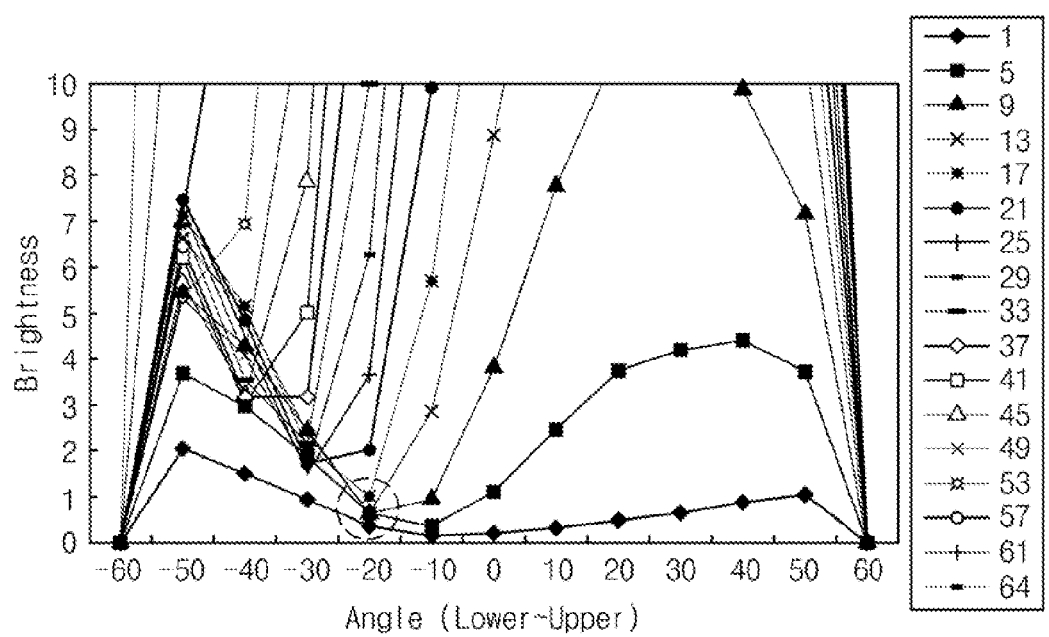
FIG. 8A is a graph showing a brightness of each gray scale level according to upper and lower viewing angles of a normal TN display.
Figure 8B:
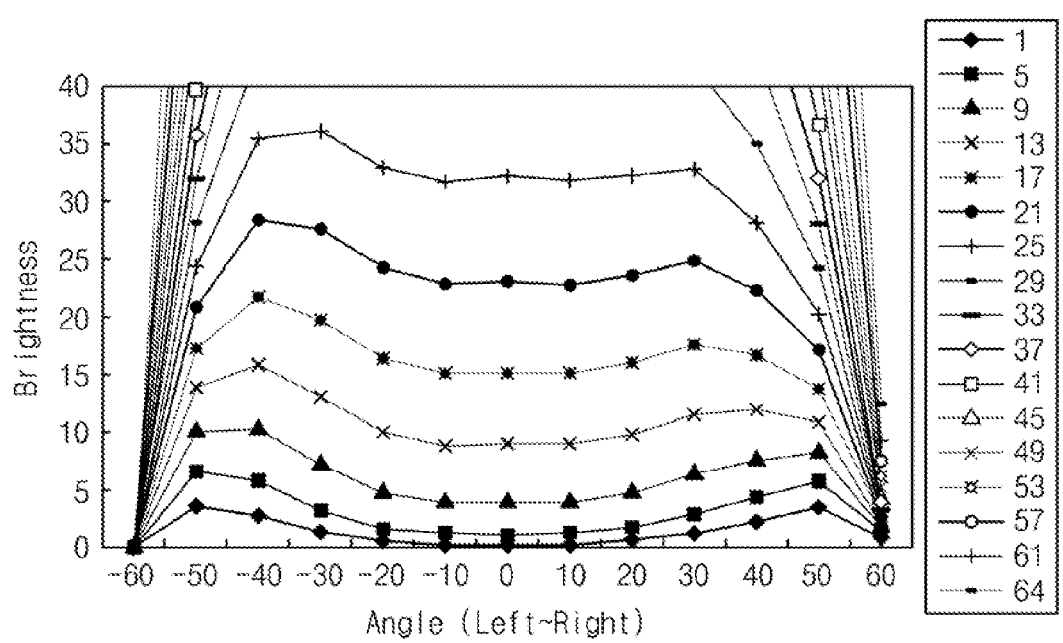
FIG. 8B is a graph showing a brightness of each gray scale level according to left and right viewing angles of a normal TN display.

FIG. 8A is a graph showing a brightness of each of selected gray scale levels according to upper and lower viewing angles of a conventional TN display (not shown), and FIG. 8B is a graph showing a brightness of each of selected gray scale levels according to left and right viewing angles of a conventional TN display.

Referring to FIGS. 8A and 8B, the brightness of each gray scale level is measured according to upper and lower viewing angles and left and right viewing angles in a conventional TN display. A gray scale inversion does not occur in a range of about −60° to about 60° in the case of left and right directions, however, the gray scale inversion occurs at a point of about −20° in the case of upper and lower directions.

That is, a viewing angle in the left and right directions is narrower than a viewing angle of the upper and lower directions.

Figure 9A:
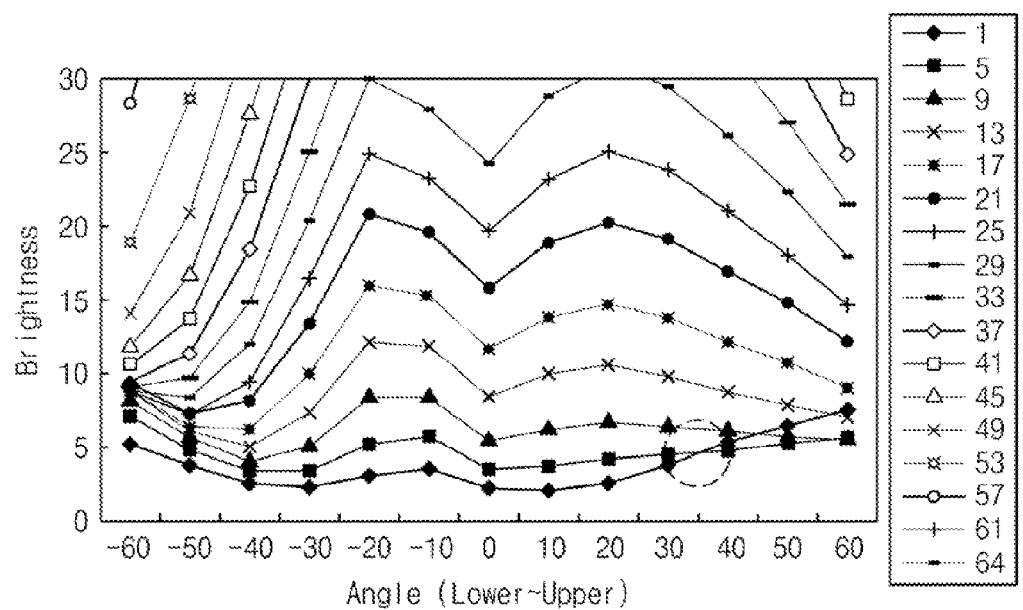
FIG. 9A is a graph showing a brightness of each gray scale level according to upper and lower viewing angles of a display apparatus having a compensation layer of FIG. 6.
Figure 9B:
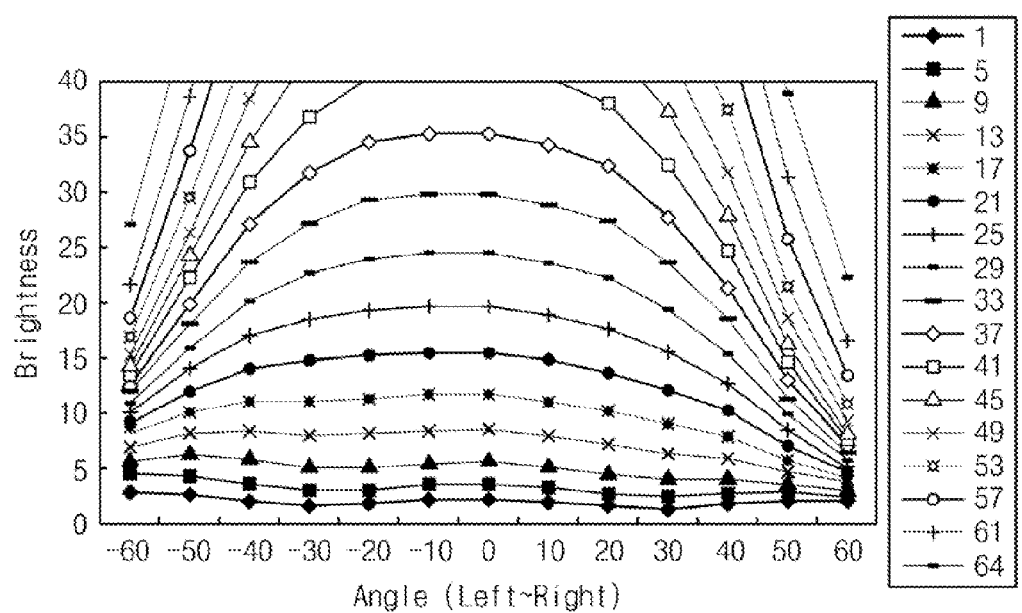
FIG. 9B is a graph showing a brightness of each gray scale level according to left and right viewing angles of a display apparatus having a compensation layer of FIG. 6.

FIG. 9A is a graph showing a brightness of each gray scale level according to upper and lower viewing angles of a display apparatus in accordance with the present disclosure and having the compensation layer of FIG. 6. FIG. 9B is a graph showing a brightness of each gray scale level according to left and right viewing angles of the display apparatus having the compensation layer of FIG. 6.

Referring to FIGS. 9A and 9B, a brightness of each gray scale level is measured according to the upper and lower viewing angles and the left and right viewing angles in a display apparatus having the compensation layer 220 of FIG. 6. The compensation layer 220 of FIG. 6 includes the second optical path changing pattern 222 that is substantially in parallel to the x-axis shown in FIG. 6.

Similar to the TN liquid crystal, perceived gray scale inversion does not occur in the range of about −60° to about 60° in the case of the left and right directions. Also, perception of the gray scale inversion does not occur in the range of about −60° to about 30° in the case of the upper and lower directions. Therefore, when the display apparatus employs the compensation layer 220 of FIG. 6, the upper and lower viewing angles are improved compared to the conventional TN display (FIGS. 8A-8B).

Figure 10A:
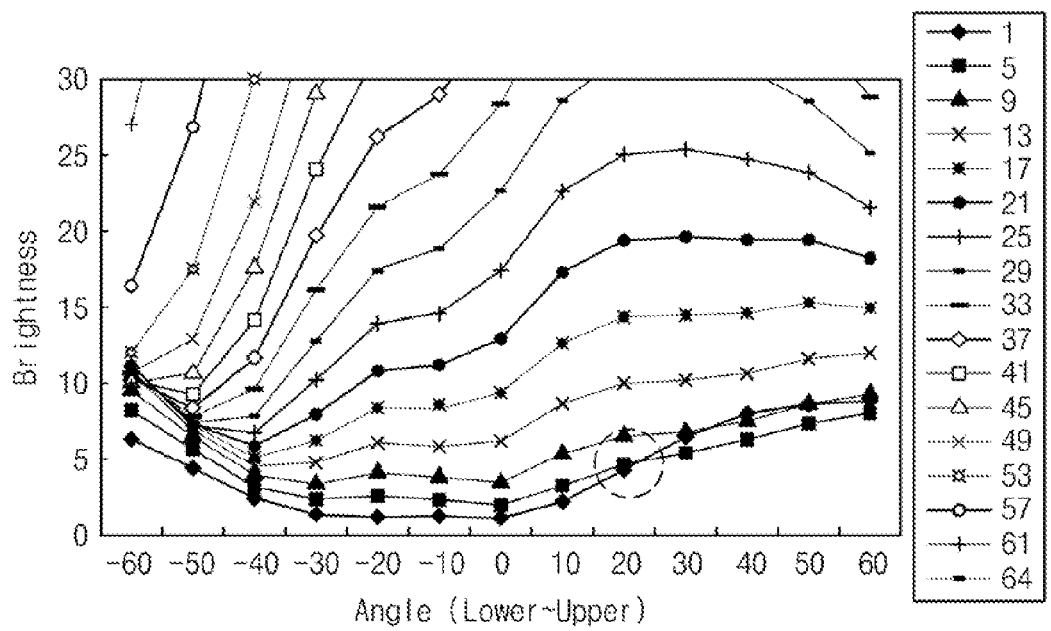
FIG. 10A is a graph showing a brightness of each gray scale level according to upper and lower viewing angles of a display apparatus having a compensation layer of FIG. 7.
Figure 10B:
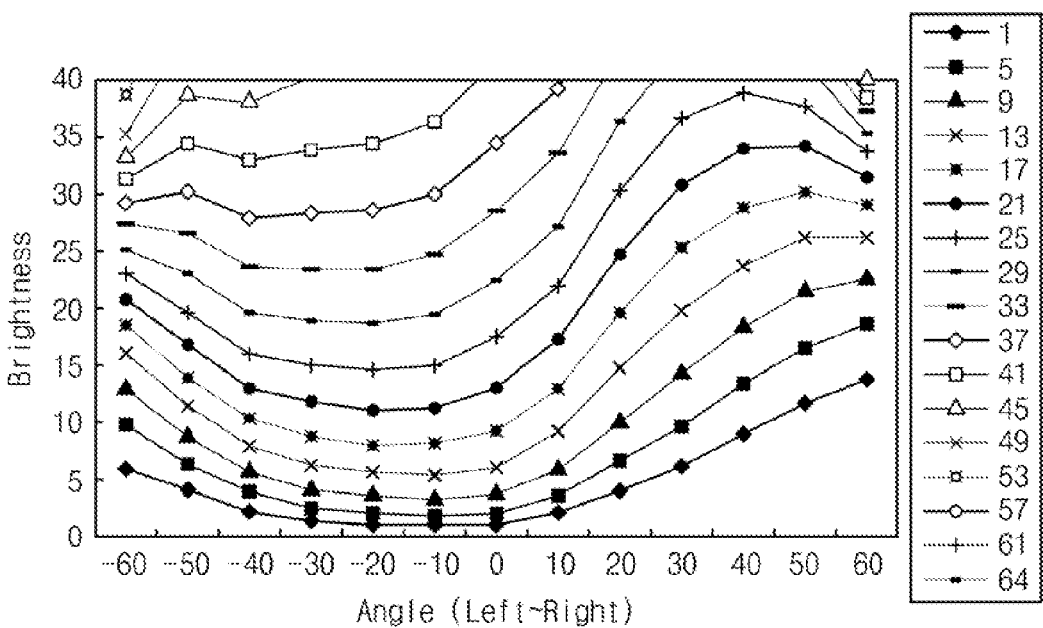
FIG. 10B is a graph showing a brightness of each gray scale level according to left and right viewing angles of a display apparatus having a compensation layer of FIG. 7.

FIG. 10A is a graph showing a brightness of each gray scale level according to upper and lower viewing angles of a display apparatus having the compensation layer of FIG. 7, and FIG. 10B is a graph showing a brightness of each gray scale level according to left and right viewing angles of a display apparatus having the compensation layer of FIG. 7.

Referring to FIGS. 10A and 10B, a brightness of each gray scale level is measured according to the upper and lower viewing angles and the left and right viewing angles of the display apparatus having the compensation layer of FIG. 7. The compensation layer 220 of FIG. 7 includes the second optical path changing pattern 222 that is inclined by about 135° with respect to the x-axis of FIG. 7.

Similar to the TN liquid crystal, the gray scale inversion does not occur in the range of about −60° to about 60° in the case of the left and right directions. Also, the gray scale inversion does not occur in the range of about −60° to about 20° in the case of the upper and lower directions. Thus, when the display apparatus employs the compensation layer 220 shown in FIG. 7, the upper and lower viewing angles are improved when compared to the TN display.

Figure 11A:
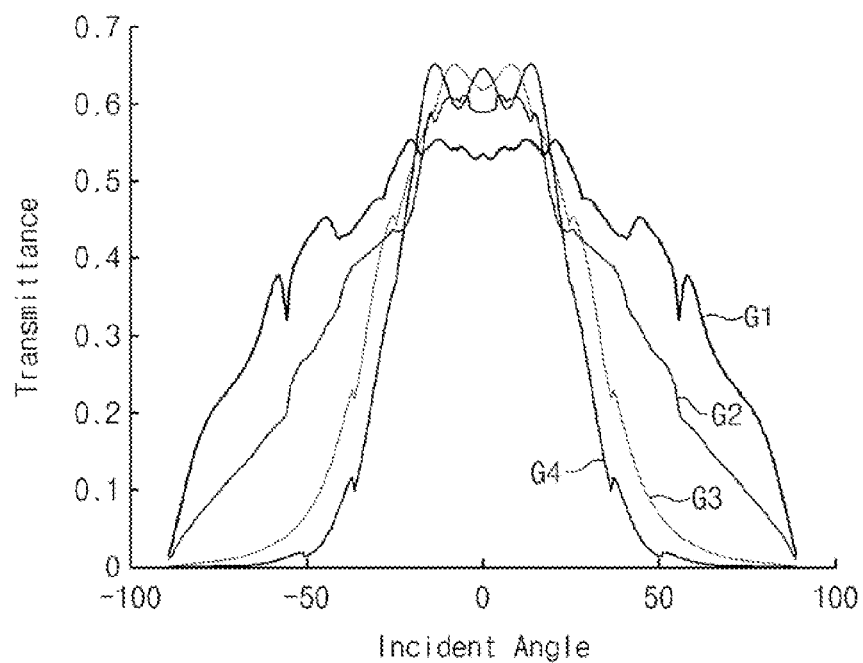
FIG. 11A is a graph showing a transmittance according to a thickness of a second optical path changing pattern in a white gray scale when the second optical path changing pattern is extended in a direction that is substantially in parallel to an x-axis of FIG. 6.
Figure 11B:
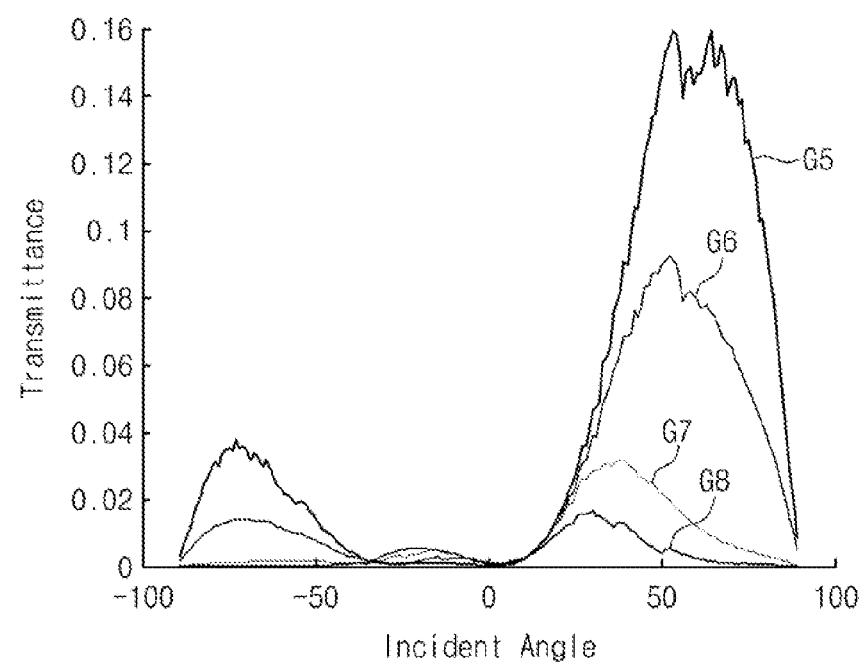
FIG. 11B is a graph showing a transmittance according to a thickness of a second optical path changing pattern in a black gray scale when the second optical path changing pattern is extended in a direction that is substantially in parallel to an x-axis of FIG. 6.

FIG. 11A is a graph showing resultant transmittance according to change of inclination angle of the incident light rays and also according to change of thickness (t1) of the second optical path changing pattern (graph plots G1-G4) where the thickness of the second optical path changing pattern is varied and the width w1 is correspondingly extended in a direction that is substantially in parallel to the y-axis of FIG. 6. FIG. 11B is a graph showing a resultant transmittance according to change of inclination angle of the incident light rays and also according to change of thickness (t1) of the second optical path changing pattern in a black gray scale in case that the second optical path changing pattern is varied and the width (w1) is correspondingly extended in a direction that is substantially in parallel to the y-axis of FIG. 6. The plotted result graphs include a first graph G1 and a fifth graph G5 representing the transmittance when the second optical path changing pattern 222 has a thickness t1 of about 1.5 µm, a second graph G2 and a sixth graph G6 representing the transmittance when the second optical path changing pattern 222 has a thickness t1 of about 3 µm, a third graph G3 and a seventh graph G7 representing the transmittance when the second optical path changing pattern 222 has a thickness t1 of about 4.5 µm, and a fourth graph G4 and an eighth graph G8 representing the transmittance when the second optical path changing pattern has a thickness t1 of about 6 µm. In addition, in FIGS. 11A and 11B, an x-axis represents an angle (that is, an incident angle θi) formed by an incident light and a normal line that is substantially perpendicular to the one surface 211 of the second base substrate 210.

Referring to details of FIG. 11A, when the display apparatus displays its maximum white gray scale, a transmittance of a light (hereinafter, referred to as a front transmittance) incident to a front surface of the second base substrate 210 becomes higher as the incident angle θi becomes smaller. In addition, in the case that the thickness t1 of the second optical path changing pattern 222 is more than 3.0 µm, the front transmittance is higher than 0.6. Thus, the thickness t1 of the second optical path changing pattern 222 may be set in consideration of desired consistency of the front transmittance.

Referring to FIG. 11B, when the display apparatus displays the black gray scale (dark output), the front transmittance becomes lower as the incident angle θi becomes smaller. Also, the front transmittance is close to zero (0) regardless of the thickness t1 of the second optical path changing pattern 222. However, a transmittance of a leakage light (hereinafter, referred as a lateral transmittance) incident while being inclined by about 50° with respect to the second base substrate 210 becomes higher as the thickness t1 of the second optical path changing pattern 222 becomes smaller. Therefore, in order to decrease the lateral transmittance, the thickness t1 of the second optical path changing pattern 222 may be set to about 3.0 µm or larger.

As described above, the transmittance in the white gray scale may be improved and the undesired transmittance of leakage light when in the black gray scale displaying mode may be decreased by controlling the thickness t1 of the second optical path changing pattern 222.

Figure 12A:
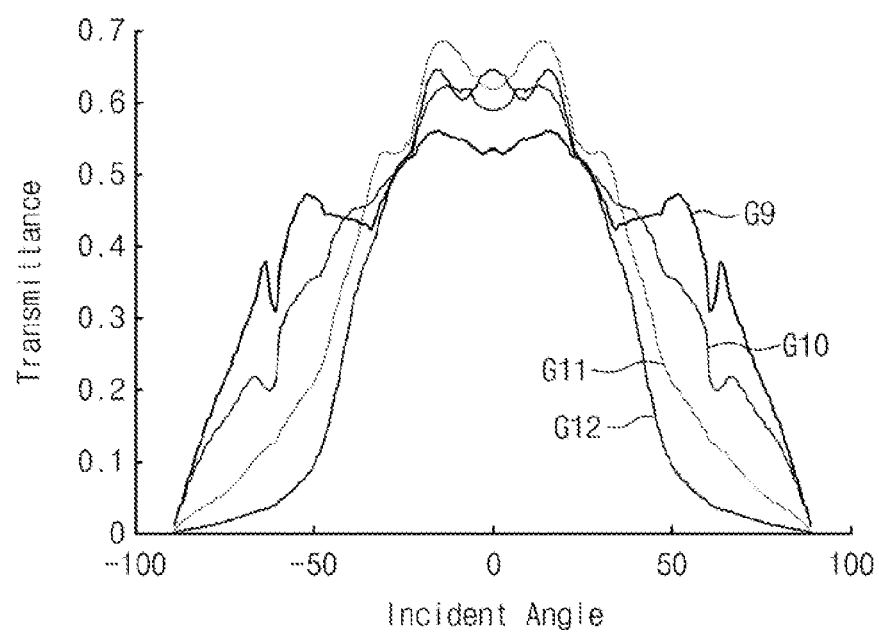
FIG. 12A is a graph showing a transmittance according to a thickness of a second optical path changing pattern in a white gray scale when the second optical path changing pattern is extended while being inclined by about 135° with respect to an x-axis of FIG. 7.
Figure 12B:
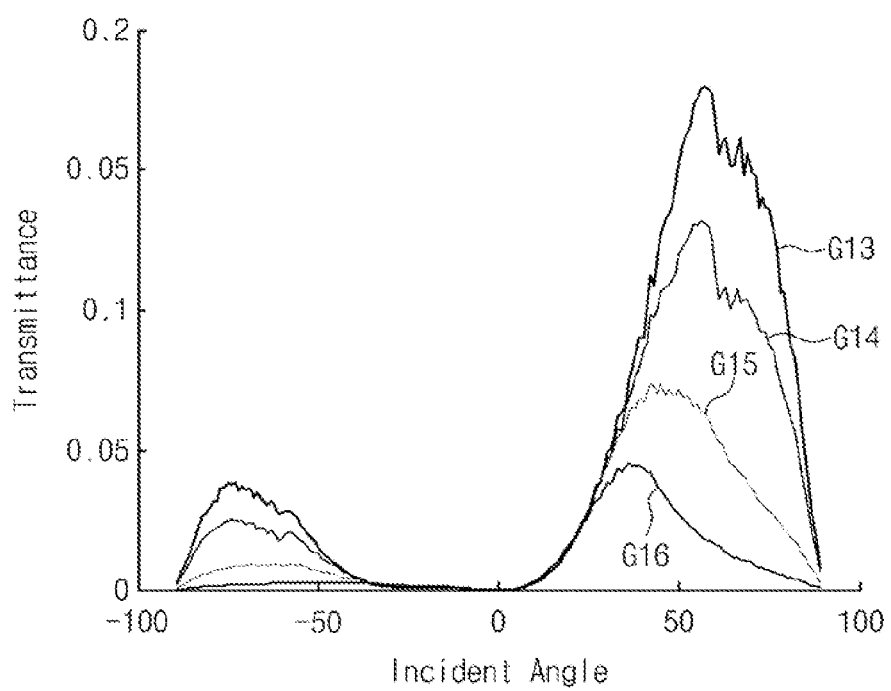
FIG. 12B is a graph showing a transmittance according to a thickness of a second optical path changing pattern in a black gray scale when the second optical path changing pattern is extended while being inclined by about 135° with respect to an x-axis of FIG. 7.

FIG. 12A is a graph showing a transmittance according to a thickness of the second optical path changing pattern in a white gray scale display mode when the second optical path changing pattern is extended while being inclined by about 135° with respect to the x-axis of FIG. 7. FIG. 12B is a graph showing a transmittance according to a thickness of the second optical path changing pattern in a black gray scale display mode when the second optical path changing pattern is extended while being inclined by about 135° with respect to the x-axis of FIG. 7. The graph plots include a ninth graph G9 and a thirteenth graph G13 representing the transmittance when the second optical path changing pattern 222 has a thickness t1 of about 1.5 µm, a tenth graph G10 and fourteenth graph G14 representing the transmittance when the second optical path changing pattern 222 has a thickness t1 of about 3 µm, an eleventh graph G11 and a fifteenth graph G15 representing the transmittance when the second optical path changing pattern 222 has a thickness t1 of about 4.5 µm, and a twelfth graph G12 and a sixteenth graph G16 representing the transmittance when the second optical path changing pattern 222 has a thickness t1 of about 6 µm. In FIGS. 12A and 12B, the graph's x-axis represents an angle (that is, an incident angle θi) formed by an incident light and a normal line that is substantially perpendicular to the one surface 211 of the second base substrate 210.

Referring to FIG. 12A, when the display apparatus displays a white gray scale, a transmittance of a light (hereinafter, referred as a front transmittance) incident to a front surface of the second base substrate 210 becomes higher as the incident angle θi becomes smaller. Also, when the second optical path changing pattern 222 has a thickness t1 larger than 3.0 μm, the front transmittance becomes larger than 0.6. Thus, the thickness t1 of the second optical path changing pattern 222 may be set in consideration of the desired amount and consistency of front transmittance.

Referring to FIG. 12B, when the display apparatus displays a black gray scale, the front transmittance becomes lower as the incident angle θi becomes smaller. Also, the front transmittance is close to zero (0) regardless to the thickness t1 of the second optical path changing pattern 222. However, a transmittance of a side leakage light (hereinafter, referred as a lateral transmittance) incident while being inclined by about 50° with respect to the second base substrate 210 becomes higher as the thickness t1 of the second optical path changing pattern 222 becomes smaller. Therefore, in order to decrease the undesired lateral transmittance, the thickness t1 of the second optical path changing pattern 222 may be set to about 3.0 μm or larger.

As described above, the transmittance in the white gray scale may be improved and the transmittance of leakage light when in the black gray scale display mode may be decreased by controlling the thickness t1 of the second optical path changing pattern 222.

Figure 13A:
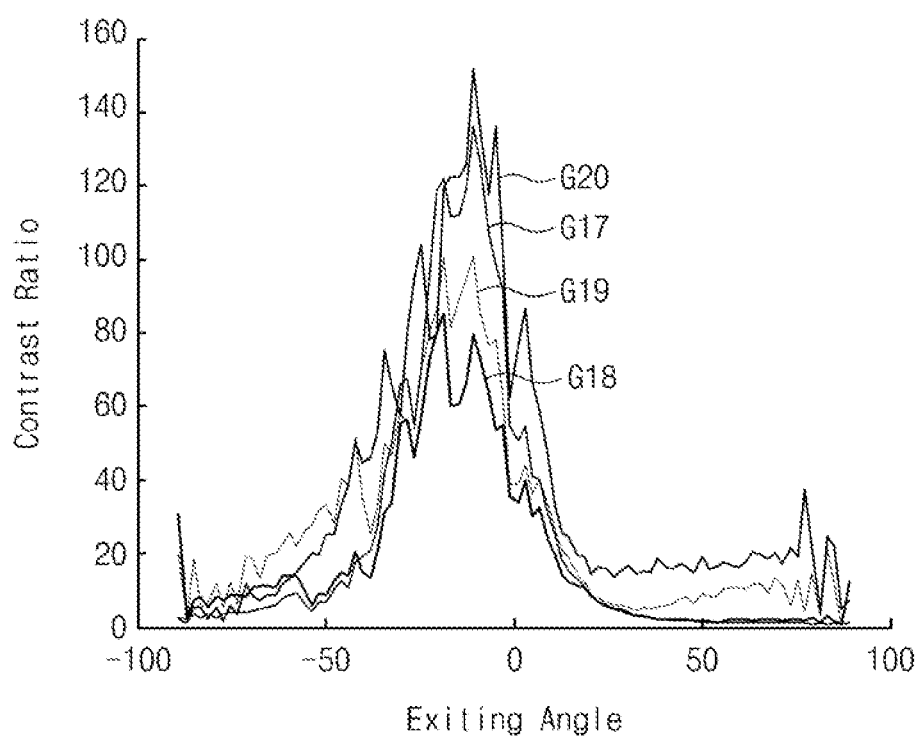
FIG. 13A is a graph showing a contrast ratio of a display apparatus in the case that a second optical path changing pattern is extended in a direction that is substantially in parallel to an x-axis of FIG. 6.
Figure 13B:
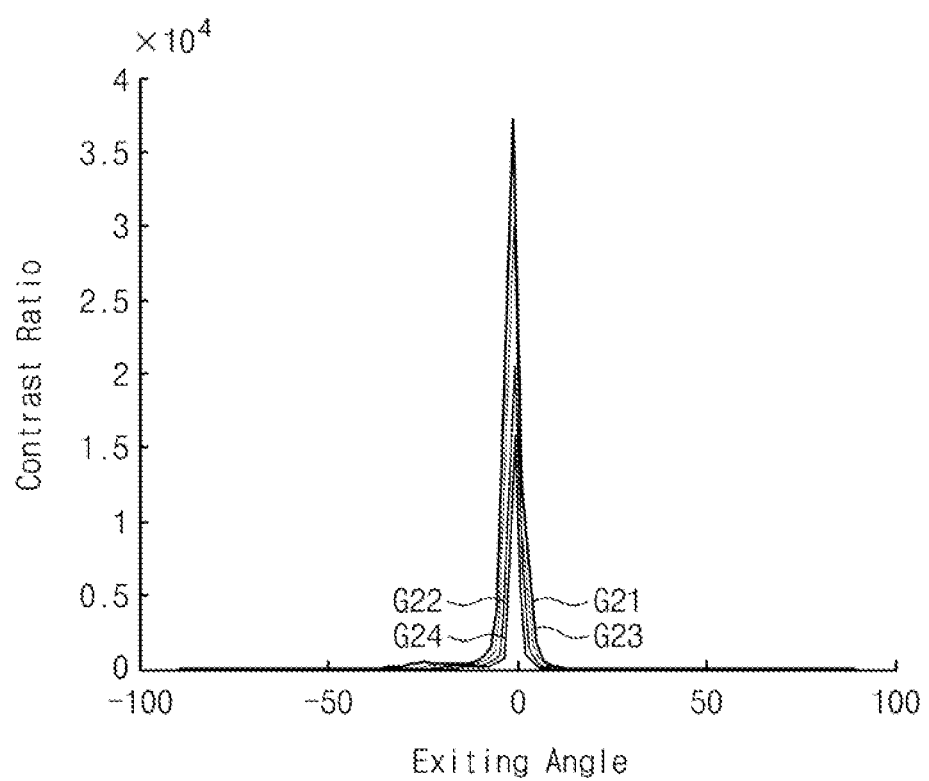
FIG. 13B is a graph showing a contrast ratio of a display apparatus in the case that a second optical path changing pattern is extended in a direction that is inclined by about 135° with respect to an x-axis of FIG. 7.

FIG. 13A is a graph showing a contrast ratio of a display apparatus in the case that the second optical path changing pattern is extended in a direction that is substantially in parallel to the x-axis of FIG. 6. FIG. 13B is a graph showing a contrast ratio of a display apparatus in the case that the second optical path changing pattern is extended in a direction that is inclined by about 135° with respect to the x-axis of FIG. 7.

In FIGS. 13A and 13B, a seventeenth graph G17 and a twenty-first graph G21 show a contrast ratio in the case that the second optical path changing pattern 222 has a thickness t1 of about 1.5 μm, an eighteenth graph G18 and a twenty-second graph G22 show a contrast ratio in the case that the second optical path changing pattern 222 has a thickness t1 of about 3 μm, a nineteenth graph G19 and a twenty-third graph G23 show a contrast ratio in the case that the second optical path changing pattern 222 has a thickness t1 of about 4.5 μm, and a twentieth graph G20 and a twenty-fourth graph G24 show a contrast ratio in the cast that the second optical path changing pattern 222 has a thickness t1 of about 6 μm.

Referring to FIG. 13A, when the second optical path changing pattern 222 is extended in a direction that is substantially in parallel to the x-axis of FIG. 6, the contrast ratio of the display apparatus is the highest when the second optical path changing pattern 222 has the thickness t1 of about 6 μm.

Referring to FIG. 13B, when the second optical path changing pattern 222 is extended in a direction that is inclined by about 135° with respect to the x-axis of FIG. 7, the contrast ratio of the display apparatus is the highest when the second optical path changing pattern 222 has the thickness t1 of about 1.5 μm.

However, a contrast ratio of the display apparatus when the second optical path changing pattern 222 is extended in a direction substantially in parallel to the x-axis of FIG. 6 is much lower than a contrast ratio of the display apparatus when the second optical path changing pattern 222 is extended in a direction that is inclined by about 135° with respect to the x-axis of FIG. 7. Thus, in order to improve the contrast ratio of the display apparatus, the second optical path changing pattern 222 should be longitudinally extended in the direction that is inclined by about 135° with respect to the x-axis.

FIGS. 14A to 14E are cross-sectional views showing a manufacturing method usable for manufacturing a compensation layer according to an exemplary embodiment of the present disclosure. Variations in shape and angle may be obtained with slit mask technologies.

Figure 14A:
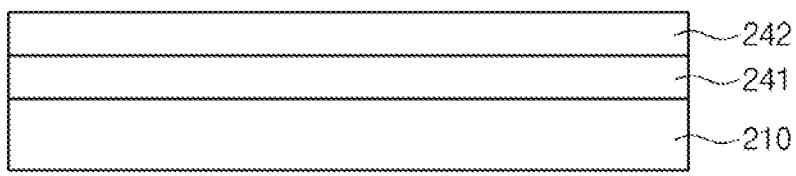
FIGS. 14A to 14E are cross-sectional views showing a manufacturing method of a compensation layer according to an exemplary embodiment in accordance with the disclosure.

Referring to FIG. 14A, an organic layer 241 having a relatively large refractive index (n1) due for example to it including at least one of an acrylic-based resin or a polyamide-based resin is formed on a second base substrate 210. As an example, when the organic layer 241 includes the acrylic-based resin or the polyamide-based resin, the organic layer 241 may have a refractive index of about 0.2 to about 0.5. As another example, the organic layer 241 may be formed by adding a titanium oxide (TiOx) to the acrylic-based resin or the polyamide-based resin. When the titanium oxide (TiOx) is added to the organic layer 241, the refractive index (n1) of the organic layer 241 may increase to about 1.9 to about 2.1

Figure 14B:
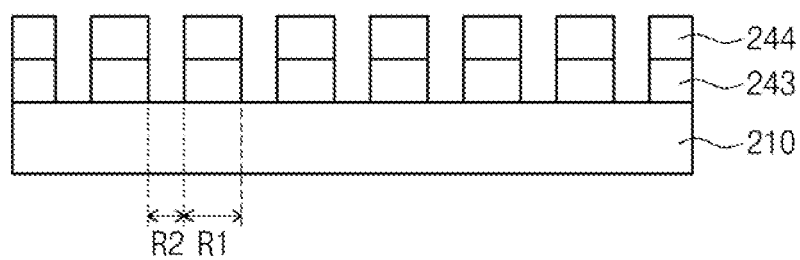
Figure 14C:
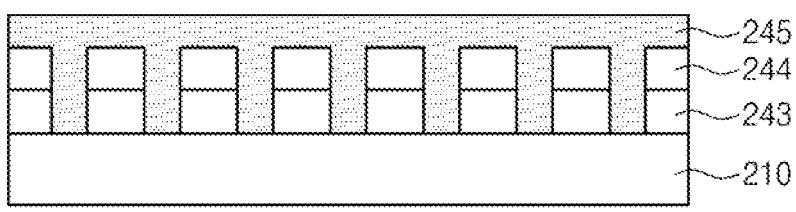

Then, a photosensitive layer (photoresist or PR) 242 is formed on the organic layer 241. Although not shown in figures, a mask (not shown) is disposed on the photosensitive layer 242. An opening is formed through the mask corresponding to a second area R2 that is positioned adjacent to a first area R1 in which a first optical path changing pattern 243 is formed. When a light is irradiated onto the photosensitive layer 242 after the mask is disposed, the photosensitive layer 242 and the organic layer 241 arranged in the second area R2 are substantially simultaneously exposed to the light. Then, the exposed photosensitive layer 242 and the organic layer 241 are substantially simultaneously developed. After that, as shown in FIG. 14B, a hardened photosensitive pattern 244 and a first optical path changing pattern 243 are formed in the first area R1 of the second base substrate 210.

An inorganic layer 245 having a relatively low refractive index (n2) due for example to it including at least one of a silicon nitride (SiNx), a silicon oxide (SiOx), a titanium oxide (TiOx), indium tin oxide (ITO), indium zinc oxide (IZO), or zinc oxide ZnOx is formed on the second base substrate 210 on which the hardened photosensitive pattern 244 and the first optical path changing pattern 243 are formed. The inorganic layer 245 may be deposited by a plasma-enhanced chemical vapor deposition (PECVD) process. In the case that the inorganic layer 245 is formed with a silicon nitride (SiNx), the refractive index of the inorganic layer 245 may be controlled by a ratio between an ammonia gas ($NH_3$) and a silane gas ($SiH_4$) during CVD deposition. Meanwhile, in the case that the inorganic layer 245 is formed with a silicon oxide layer (SiOx), the refractive index of the inorganic layer 245 may be controlled by a ratio between a silane gas ($SiH_4$) and an oxide nitrogen gas ($N_2O$) during CVD deposition.

Then, an etching mask (not shown) including a photosensitive layer and an optional ITO layer (not shown) is arranged on the inorganic layer 245, and the inorganic layer 245 is selectively dry-etched. The inorganic layer 245 may be dry-etched by an inductively coupled plasma (ICP) method or a reactive ion etching (RIE) method.

In the dry etching process, a sulfur hexafluoride ($SF_6$) gas or a mixture gas of the sulfur hexafluoride ($SF_6$) gas and an oxygen gas ($O_2$) may be used as the etching gas.

Figure 14D:
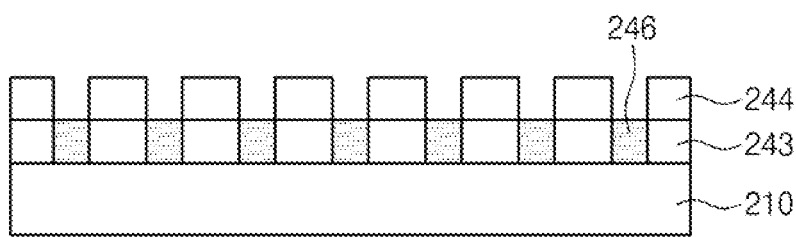
Figure 14E:
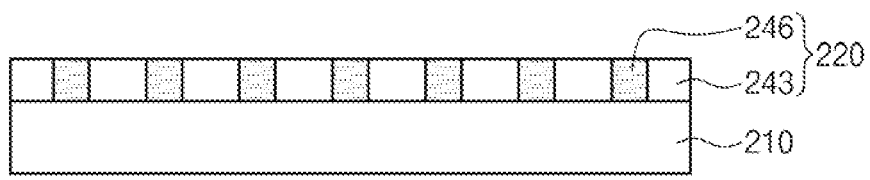

As shown in FIG. 14D, the inorganic layer 245 is etched to form a second optical path changing pattern 246 on the second base substrate 210. the thickness t1 of the second optical path changing pattern 246 may be independently changed by changing an amount of the etching gas used, and/or changing the etching duration, and/or a temperature, pressure or power of the etching chamber.

Then, when the photosensitive pattern 244 is stripped, the first optical path changing pattern 243 is formed in the first area R1 of the second base substrate 210 and the second optical path changing pattern 246 is formed in the second area R2. Thus, the compensation layer 220 may be completely formed on the second base substrate 210.

FIGS. 15A to 15H are cross-sectional views showing a manufacturing method of a compensation layer according to another exemplary embodiment.

Figure 15A:
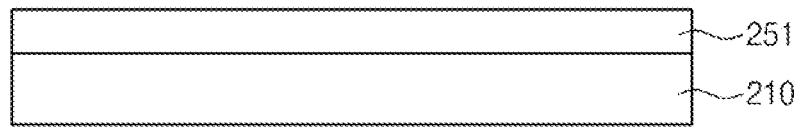
FIGS. 15A to 15H are cross-sectional views showing a manufacturing method of a compensation layer according to another exemplary embodiment.
Figure 15B:
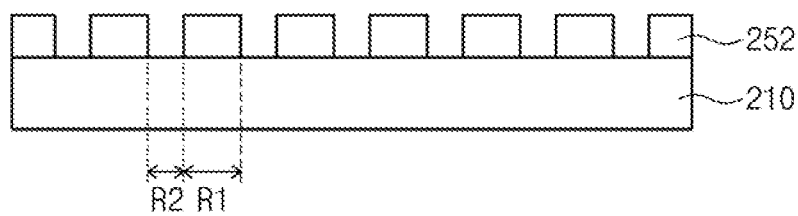

Referring to FIG. 15A, a photosensitive layer 251 is formed on a second base substrate 210. Although not shown in FIG. 15A, a mask (not shown) having an opening formed therethrough corresponding to a second area R2 is arranged on the photosensitive layer 251. When a light is irradiated onto the photosensitive layer 251 after the mask is arranged, the photosensitive layer 251 arranged in a first area R1 is exposed to the light. Then, when the exposed photosensitive layer 251 is developed, as shown in FIG. 15B, a hardened photosensitive pattern 252 is formed in the first area R1 of the second base substrate 210.

Figure 15C:
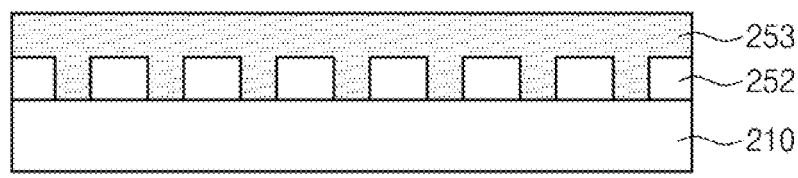

Referring to FIG. 15C, an inorganic layer 253 including at least one of a silicon nitride (SiNx), a silicon oxide (SiOx), a titanium oxide (TiOx), indium tin oxide (ITO), indium zinc oxide (IZO), or zinc oxide (ZnOx) is formed. The inorganic layer 253 may be deposited by a plasma-enhanced chemical vapor deposition (PECVD) process.

Then, an etching mask (not shown) including a photosensitive layer or an ITO layer (optional) is arranged on the inorganic layer 253 and the inorganic layer 253 is dry-etched. The inorganic layer 253 may be dry-etched by an inductively coupled plasma (ICP) method or a reactive ion etching (RIE) method.

In the dry etching process, a sulfur hexafluoride ($SF_6$) gas or a mixture gas of the sulfur hexafluoride ($SF_6$) gas and an oxygen gas ($O_2$) may be used as an etching gas.

Figure 15D:
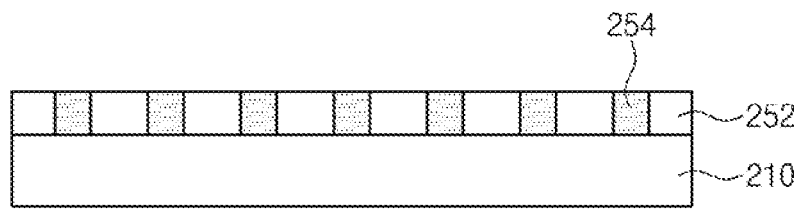

As shown in FIG. 15D, the inorganic layer 253 is etched to form a second optical path changing pattern 254 on the second base substrate 210. The thickness t1 of the second optical path changing pattern 254 may be independently changed according to an amount of the etching gas, an etching duration, and a temperature and pressure of an etching chamber.

Figure 15E:
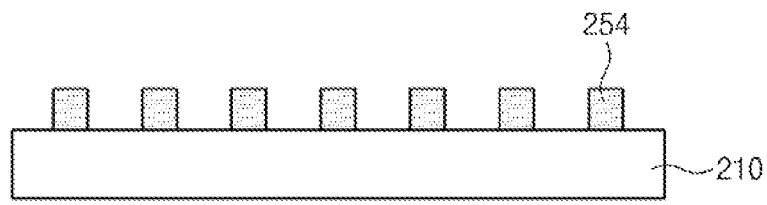

Then, when the hardened photosensitive pattern 252 is selectively stripped away, the second optical path changing pattern 254 is left behind on the second base substrate 210 as shown in FIG. 15E.

Figure 15F:
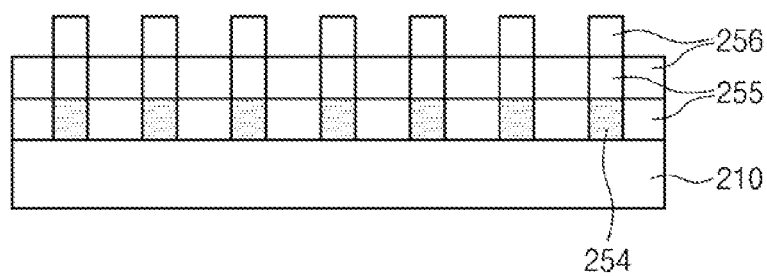

Referring to FIG. 15F, an organic layer 255 including at least an acrylic-based resin or a polyamide-based resin is formed on the second base substrate 210 on which the second optical path changing pattern 254 is formed. As an exemplary embodiment of the present invention, the organic layer 255 including the acrylic-based resin or the polyamide-based resin may have a refractive index of about 0.2 to about 0.5. As another exemplary embodiment of the present invention, the titanium oxide (TiOx) may be added into the acrylic-based resin or the polyamide-based resin when forming the organic layer 255. When the titanium oxide (TiOx) is added into the acrylic-based resin or the polyamide-based resin, the refractive index of the organic layer 255 may increase to about 1.9 to about 2.1

Figure 15G:
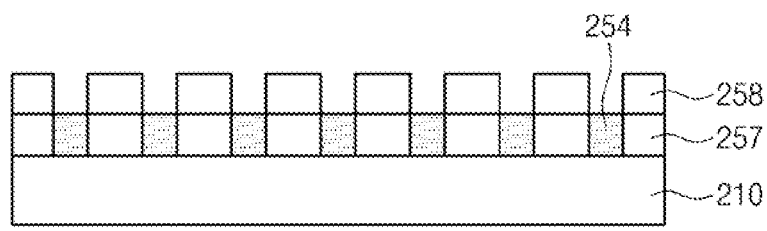
Figure 15H:
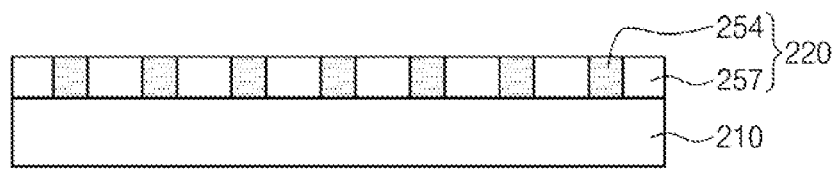

Then, a patterned photosensitive layer 256 is formed on the organic layer 255. Although not shown in figures, a mask (not shown) having an opening formed therethrough is arranged on the photosensitive layer 256 corresponding to a second area R2 of the second base substrate 210. When a light is irradiated onto the photosensitive layer 256 after the mask is arranged, the photosensitive layer 256 and the organic layer 255 arranged on the second area R2 are substantially simultaneously exposed to the light. Then, the exposed photosensitive layer 256 and the organic layer 255 are substantially simultaneously developed. As a result, a photosensitive pattern 258 and a first optical path changing pattern 257 are formed in a first area R1 of the second base substrate 210 as shown in FIG. 15G.

Then, when the photosensitive pattern 258 is selectively stripped away, the first optical path changing pattern 257 is formed in the first area R1 of the second base substrate 210, and the second optical path changing pattern 254 is formed in the second area R2. Consequently, a compensation layer 220 may be completely formed on the second base substrate 210.

In FIGS. 14A to 14E and 15A to 15H, a method of forming the compensation layer 220 on the second substrate 210 has been described. In the manufacturing process of the display apparatus 500, the additional methods of forming the first substrate 100 and interposing the liquid crystal layer 300 between the first substrate 100 and the second substrate 200 will be known to one ordinary skilled in the art, and therefore detailed description thereof will be omitted here.

Although the exemplary embodiments of the present teachings have been described, it is understood that the present teachings should not be limited to these exemplary embodiments but various changes and modifications can be made by one ordinary skilled in the art in light of the foregoing and within the spirit and scope of the present teachings.

What is claimed is:

1. A method of manufacturing a display apparatus, comprising:

forming a first substrate including a first base substrate and a plurality of pixel units arranged on the first base substrate;

forming a second substrate including a second base substrate facing the first base substrate and a compensation layer arranged on one surface of the second base substrate and facing a major surface of the first substrate wherein the forming of the second substrate comprises:

forming a first layer having a first refractive index on the one surface of the second base substrate;

patterning the first layer to form a plurality of first optical path changing patterns that are spaced apart from one other along a first direction; and forming a second layer having a second refractive index different from the first refractive index, where the formed second layer has portions thereof interposed between the spaced apart first optical path changing patterns, wherein the compensation layer includes one homogenous light-passing medium in a first area and includes two light-passing media having different refractive indexes in a second area, and wherein a light transmittance of the first area is larger than a light transmittance of the second area.

2. The method of claim 1, wherein the second refractive index is lower than the first refractive index.

3. The method of claim 2, wherein the first layer comprises an organic resin including at least one of an acrylic-based resin or a polyamide-based resin and has a refractive index of about 1.2 to about 2.1.

4. The method of claim 3, wherein the first layer further comprises a titanium oxide added into the organic resin.

5. The method of claim 3, wherein the organic resin is colored with a colored dye or pigment.

6. The method of claim 3, wherein the second layer comprises at least a silicon nitride, a silicon oxide, a titanium oxide, an indium tin oxide, an indium zinc oxide, or a zinc oxide, and the second layer has a refractive index of about 1 to about 1.6.

7. The method of claim 1, wherein the second layer comprises a black carbon to absorb leakage light rays that pass through the contact surfaces.

8. The method of claim 1, wherein the forming of the second substrate further comprises forming a cover layer covering the first optical path changing patterns and the second layer.

9. The method of claim 8, wherein the first optical path changing patterns comprise an organic layer colored by a colored dye or pigment.

10. The method of claim 1, further comprising forming a first polarizing plate arranged adjacent to the first substrate to polarize light rays that are incident to the first substrate; and forming a second polarizing plate arranged adjacent to the second substrate to polarize light rays that are output from the compensation layer.

11. The method of claim 10, wherein each of the first and second optical path changing patterns is extended in a direction that is substantially in parallel to an absorption axis of the second polarizing plate or in a direction that is inclined about 135 degrees to the absorption axis of the second polarizing plate.

12. A method of manufacturing a display apparatus, comprising:

forming a first base substrate;

forming a plurality of pixel units on the first base substrate;

forming a second base substrate facing the first base substrate;

forming a plurality of first optical path changing patterns having a first refractive index on a surface of the second base substrate, the plurality of first optical path changing patterns are spaced from one another;

forming a plurality of second optical path changing patterns having a second refractive index different from the first refractive index, each of the plurality of second optical path changing patterns interposed between the plurality of first optical path changing patterns; and forming a cover layer having the second refractive index and covering both the first optical path changing pattern and the second optical path changing pattern.

13. The method of claim 12, wherein the second refractive index is higher than the first refractive index.

14. The method of claim 12, wherein the plurality of first optical path changing patterns have first-pattern surfaces that are inclined with respect to the surface of the second base substrate, and Wherein the plurality of second optical path changing patterns have second-pattern surfaces that are inclined with respect to the surface of the second base substrate and directly contact the first-pattern surfaces.

* * * * *